(12) United States Patent
Kobayashi (10) Patent No.: US 7,058,825 B2
(45) Date of Patent: Jun. 6, 2006

(54) ELECTRONIC APPARATUS AND POWER SUPPLY METHOD THAT STOPS POWER TO AUTHENTICATED PARTNER APPARATUS WHEN POWER IS BRANCHED TO ANOTHER APPARATUS VIA THE PARTNER APPARATUS

(75) Inventor: Hiroaki Kobayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 454 days.

(21) Appl. No.: 10/422,804

(22) Filed: Apr. 25, 2003

(65) Prior Publication Data

US 2004/0003304 A1   Jan. 1, 2004

(30) Foreign Application Priority Data

Jun. 28, 2002   (JP)   ............................. 2002-190891

(51) Int. Cl.
  *G06F 1/26*   (2006.01)
(52) U.S. Cl. .................... 713/300; 713/168
(58) Field of Classification Search ............... 713/168, 713/300
  See application file for complete search history.

(56) References Cited

U.S. PATENT DOCUMENTS 5,751,672 A    5/1998  Yankowski
5,903,064 A *  5/1999  Norberg ....................... 307/40

FOREIGN PATENT DOCUMENTS

| JP | 10-154380 | 6/1998 |
|---|---|---|
| JP | 11-243651 | 9/1999 |
| JP | 2000-224548 | 8/2000 |
| JP | 2001-155469 | 6/2001 |
| JP | 2001-243707 | 9/2001 |
| JP | 2001-521642 | 11/2001 |
| WO | WO 98/47080 | 10/1998 |
| WO | WO 01/33852 A1 | 5/2001 |

OTHER PUBLICATIONS

Japanese Office Action, dated Jul. 27, 2004 for Patent Application No. 2002-190891.
Japanese Office Action dated Jul. 27, 2004 for Patent Application No. 2002-049749.

\* cited by examiner

*Primary Examiner*—Thomas Lee
*Assistant Examiner*—Albert Wang
(74) *Attorney, Agent, or Firm*—Pillsbury Winthrop Shaw Pittman, LLP (57) ABSTRACT

An electronic apparatus as an aspect of this invention includes a power supply unit configured to supply electric power to a partner apparatus, a communication unit configured to communicate with the partner apparatus, an authentication unit configured to authenticate the partner apparatus on the basis of information acquired from the partner apparatus by the communication unit, and a power supply control unit configured to control power supply to the partner apparatus by the power supply unit on the basis of the result of authentication of the partner apparatus by the authentication unit.

4 Claims, 5 Drawing Sheets

| 0X30 (8 bit) | Power_Requirements (24 bit) |

ELECTRONIC APPARATUS AND POWER SUPPLY METHOD THAT STOPS POWER TO AUTHENTICATED PARTNER APPARATUS WHEN POWER IS BRANCHED TO ANOTHER APPARATUS VIA THE PARTNER APPARATUS

CROSS-REFERENCE TO RELATED APPLICATIONS

This application is based upon and claims the benefit of priority from the prior Japanese Patent Application No. 2002-190891, filed Jun. 28, 2002, the entire contents of which are incorporated herein by reference.

BACKGROUND OF THE INVENTION

1. Field of the Invention

The present invention relates to an electronic apparatus and power supply method of supplying electric power to a partner apparatus.

2. Description of the Related Art

By the IEEE1394-1995 standard, electric power can be supplied to an apparatus connected by a 6-pin cable. However, an apparatus on the supply side need not supply power even though a 6-pin cable is used. When electric power is to be supplied, it is defined that a voltage of 8 to 30 V and a maximum of 1.5 A/port can be supplied. An apparatus connected by a 6-pin cable can freely choose whether to operate by electric power supplied from the connected cable or by electric power from its own power source.

As described above, the power supply side can choose whether to supply power according to convenience, and the power consuming side can choose whether to consume supplied power according to convenience. The power capacity of each of the supply side and consuming side is indicated by information contained in a self-ID packet. This self-ID packet contains information indicating the attribute of an apparatus, and is transmitted to a 1394 network by the apparatus when a cable is inserted into a 1394 bus or when electric power is supplied.

A signal line for data transfer and a power line for power supply are integrated into one cable and connected to one connector.

Unfortunately, this power supply technique has the following problem.

An apparatus on the power supply side supplies power without knowing the identity of a partner apparatus on the power consuming side. If this partner apparatus is of bad behavior or has a malicious intent, the apparatus may give damage to a power supply circuit of the apparatus on the supply side.

To avoid this problem, a circuit such as a current limiting circuit or fuse can be inserted. In this case, however, electric power is still supplied to an unidentified partner apparatus. The higher the perfection of the countermeasure against this problem, the higher the cost.

BRIEF SUMMARY OF THE INVENTION

An electronic apparatus of an aspect of the present invention comprises a power supply unit configured to supply electric power to a partner apparatus, a communication unit configured to communicate with the partner apparatus, an authentication unit configured to authenticate the partner apparatus on the basis of information acquired from the partner apparatus by the communication unit, and a power supply control unit configured to control power supply to the partner apparatus by the power supply unit on the basis of the result of authentication of the partner apparatus by the authentication unit.

A power supply method of another aspect of the present invention comprises authenticating a partner apparatus of power supply on the basis of information acquired from the partner apparatus, and controlling power supply to the partner apparatus on the basis of the result of authentication of the partner apparatus.

BRIEF DESCRIPTION OF THE SEVERAL VIEWS OF THE DRAWING

The accompanying drawings, which are incorporated in and constitute a part of the specification, illustrate presently preferred embodiments of the invention and, together with the generation description given above and the detailed description of the preferred embodiments given below, serve to explain the principles of the invention.

DETAILED DESCRIPTION OF THE INVENTION

An embodiment of the present invention will be described below with reference to the accompanying drawing.

Figures 1, 2:
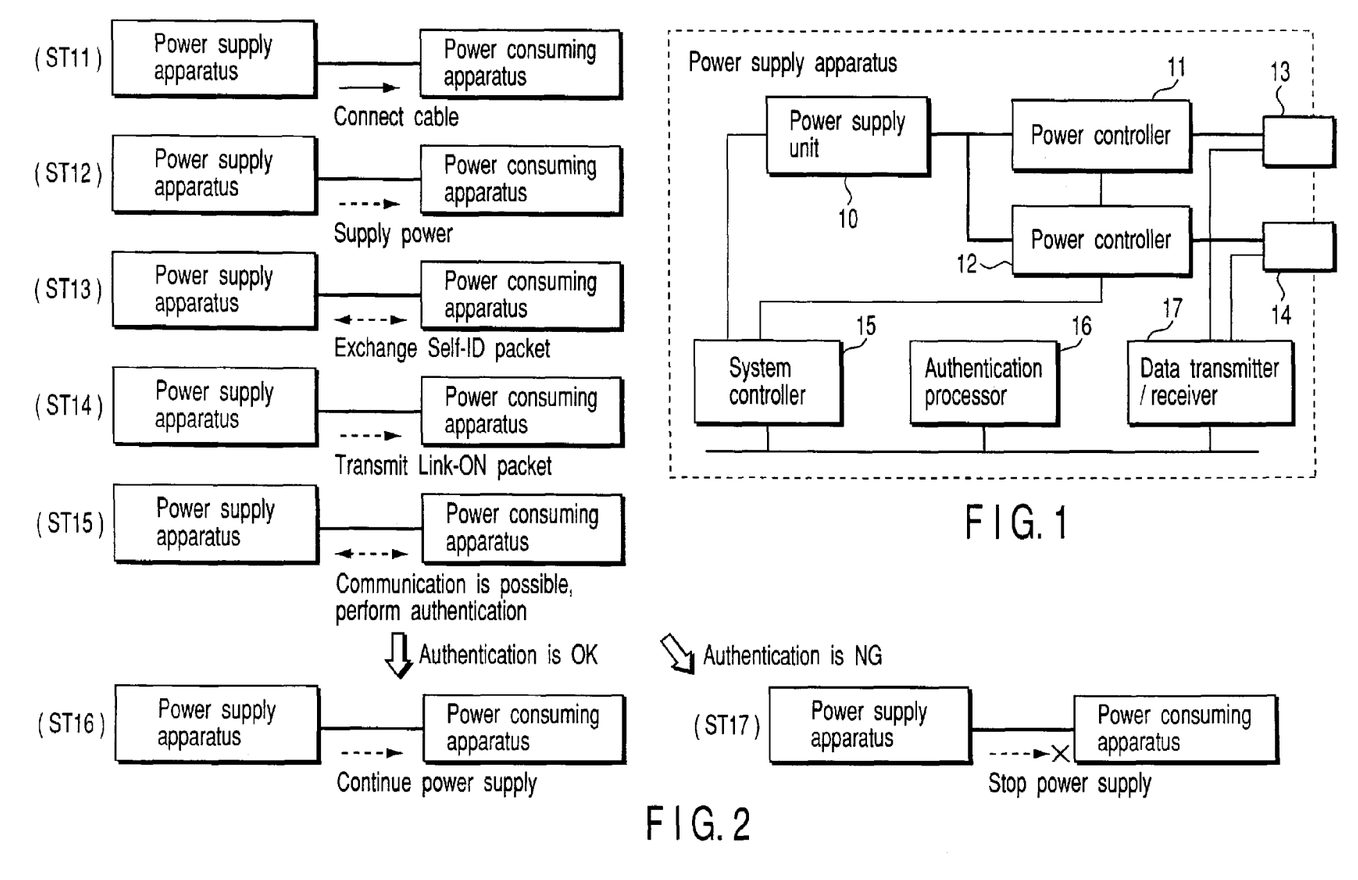
FIG. 1 is a block diagram showing an outline of the arrangement of an electronic apparatus (power supply apparatus) as an embodiment of the present invention.
FIG. 2 is an operation transition chart for explaining an example of control of power supply from the power supply apparatus to a power consuming apparatus.

FIG. 1 is a block diagram showing an outline of the arrangement of a power supply apparatus (electronic apparatus) according to an embodiment of the present invention. As shown in FIG. 1, this power supply apparatus includes a power supply unit 10, first power controller 11, second power controller 12, first connector 13, second connector 14, system controller 15, authentication processor 16, and data transmitter/receiver 17. The first and second connectors 13 and 14 are based on the IEEE1394-1995 standard.

Under the control of the power controller 11, electric power from the power supply unit 10 is supplied to a partner apparatus (power consuming apparatus) on a 1394 bus via the connector 13. The power controller 11 controls the start and stop of power supply to the partner apparatus connected via the connector 13. This power controller 11 also controls the power capacity to be supplied to the partner apparatus connected via the connector 13.

Likewise, under the control of the power controller 12, electric power from the power supply unit 10 is supplied to a partner apparatus on the 1394 bus via the connector 12. The power controller 12 controls the start and stop of power supply to the partner apparatus connected via the connector 14. This power controller 12 also controls the power capacity to be supplied to the partner apparatus connected via the connector 14.

In this embodiment, the power supply apparatus having two connectors, i.e., the first and second connectors 13 and 14 will be explained. However, the present invention is not limited to this embodiment, so the number of connectors can also be one or three or more.

The system controller 15 controls the whole system including its own power supply apparatus and the partner apparatuses. The authentication processor 16 authenticates the partner apparatus on the basis of information provided by the partner apparatus. The data transmitter/receiver 17 exchanges data with the partner apparatus on the 1394 bus via the first or second connector 13 or 14.

On the basis of the result of authentication of the partner apparatus performed by the authentication processor 16, the system controller 15 outputs a power control instruction to the power controllers 11 and 12. This power control instruction includes not only an instruction for the start and stop of power supply, but also an instruction concerning the power capacity to be supplied. On the basis of this power control instruction from the system controller 15, the power controller 11 controls the electric power supplied from the connector 13 to the partner apparatus. Similarly, on the basis of the power control instruction from the system controller 15, the power controller 12 controls the electric power supplied from the connector 14 to the partner apparatus.

Note that the system controller 15 and authentication processor 16 can be the same block or different blocks as shown in FIG. 1.

First, an outline of power supply will be explained. The power supply apparatus of the present invention confirms and authenticates a partner apparatus, and supplies electric power only to a confirmed and authenticated partner apparatus. Strictly speaking, the power supply apparatus continues power supply only to a confirmed and authenticated partner apparatus.

A power consuming apparatus which consumes electric power in accordance with the IEEE1394-1995 standard is activated by electric power supplied via the bus. The power supply apparatus supplies power to the power consuming apparatus so as to activate only the physical layer of this power consuming apparatus. Upon receiving this power supply, the power consuming apparatus sends a self-ID packet. This self-ID packet describes that the power consuming apparatus receives power supply via the bus and the link layer of the power consuming apparatus is off, and also describes the power capacity required by the power consuming apparatus.

The power supply apparatus receives the self-ID packet from the power consuming apparatus, and sends a link-ON packet for activating the link layer higher than the physical layer. When the power consuming apparatus receives this link-ON packet, the link layer is activated, and this makes the power consuming apparatus capable of communicating with the power supply apparatus. The operation up to this point is based on the IEEE1394-1995 standard.

After that, the power supply apparatus performs confirmation and authentication to check whether to supply power to the power consuming apparatus. A method of easily confirming a partner apparatus is to load and discriminate power information contained in the self-ID packet or information in a config_ROM area. If the power capacity indicated by the power information does not correspond to the predicted power capacity, it is determined that this partner apparatus is unauthorized. A partner apparatus can also be identified from the type or manufacturer name of the partner apparatus indicated by the information in the config_ROM area.

Unfortunately, information contained in the self-ID packet can be easily copied. Therefore, the above discrimination method alone is unsatisfactory, so authentication is also used. For example, DTCP (Digital Transmission Content Protection) as an encryption system used in isochronous transmission (mainly used in video data transmission) of IEEE1394 uses signature to confirm the partner. This signature is used in authentication. It is also possible to identify a partner apparatus by using a general public key system or private key system.

In this authentication process, information indicating the power capacity required by the partner apparatus and information indicating whether to distribute electric power to another apparatus via the partner apparatus are contained, in addition to authentication information, in information provided by the power consuming apparatus. This can reduce the communication traffic between the power supply apparatus and power consuming apparatus.

If the partner apparatus can be identified, the power supply apparatus continues power supply. If the partner apparatus cannot be identified, the power supply apparatus stops power supply. Accordingly, it is possible to reduce the load of the power supply unit of the power supply apparatus or protect the unit against damage.

FIG. 2 is an operation transition chart for explaining control of power supply from the power supply apparatus to the power consuming apparatus.

First, the power supply apparatus and partner apparatus (power consuming apparatus) are connected by a cable (ST11). Accordingly, the power supply apparatus (system controller 15) detects that a certain apparatus is connected. The power supply apparatus (system controller 15) detects that no self-ID packet is transmitted from the partner apparatus, and that this partner apparatus requires power supply or stops power supply from its own power source.

Subsequently, the power supply apparatus supplies electric power to the partner apparatus under the control of the system controller 15 or power controller 11 or 12 (ST12). When a partner apparatus requiring power supply from another apparatus receives power supply from another apparatus, the physical layer of this partner apparatus is rendered operable. However, the physical layer of a partner apparatus which stops power supply from its own power source does not become operable even if power is supplied from another apparatus. When the physical layer of the partner apparatus becomes operable, the partner apparatus sends a self-ID packet to the power supply apparatus (ST13).

When receiving this self-ID packet, the power supply apparatus checks the number of apparatuses connected to the bus, checks whether these apparatuses consume electric power, and checks whether the link layers of these apparatuses are in operation. At this time, the power supply apparatus can detect the power capacity required by the partner apparatus. In the 1394a standard, the necessary power capacity is classified into three ranks: 3 W or less, up to 6 W, and up to 10 W. The power supply apparatus (system controller 15) has detected the power capacity required by the partner apparatus. The power supply apparatus determines that the partner apparatus which requires power capacity other than the power capacity detected by the power supply apparatus is an unidentified apparatus. That is, the power supply apparatus can determine whether the partner apparatus is an object of power supply, from the power capacity required by the partner apparatus.

If the link layer higher than the physical layer of the partner apparatus is not in operation, the power supply apparatus transmits a link-ON packet to the node of the partner apparatus (ST14). This link-ON packet instructs the partner apparatus to turn on the link layer higher than the physical layer.

Upon receiving this link-ON packet, the partner apparatus starts supplying power to the link layer. This allows the partner apparatus to communicate with another apparatus connected. After that, the power supply apparatus authenticates the partner apparatus, and acquires power information of the partner apparatus. In this way, the power supply apparatus performs confirmation, e.g., checks the type of the partner apparatus as a power consuming apparatus, and checks the amount of electric power required by the apparatus (ST15).

If it is determined by the authentication process that the connected partner apparatus is an object of power supply, the power supply apparatus continues power supply to the partner apparatus (ST16). If it is determined that the partner apparatus is not an object of power supply, the power supply apparatus stops power supply to the partner apparatus (ST17). In this case, it is also useful to check by the system controller 15 of the power supply apparatus whether to keep connecting to the partner apparatus which is not an object of power supply, and disconnect the partner apparatus by controlling the physical layer. This may also be determined on the basis of an instruction from a user by using a GUI (Graphical User Interface), not by the system controller 15.

Figure 3:
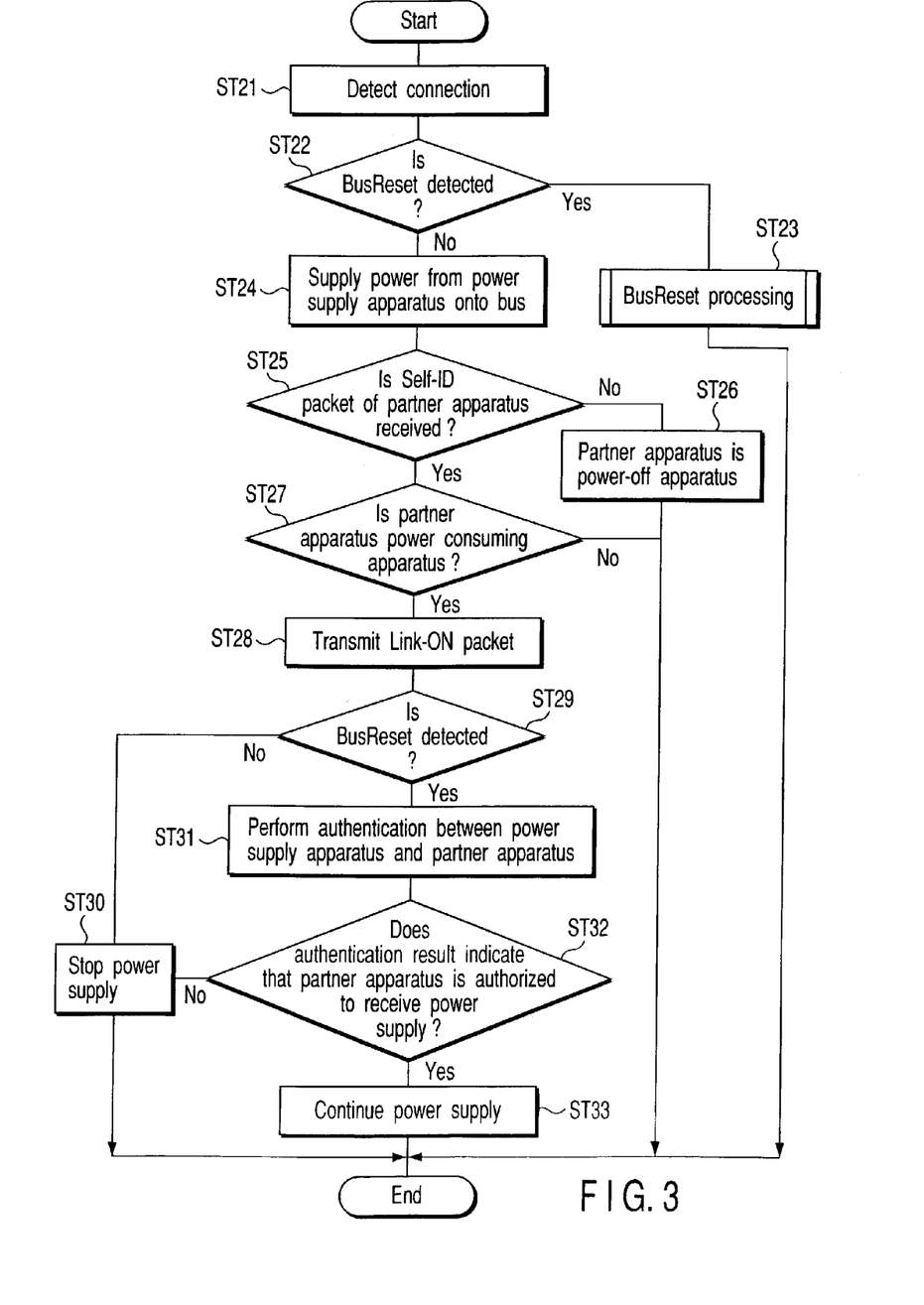
FIG. 3 is a flow chart for explaining an example of control of power supply from the power supply apparatus to the power consuming apparatus.

FIG. 3 is a flow chart for explaining control of power supply from the power supply apparatus to the power consuming apparatus. This flow chart shown in FIG. 3 corresponds to the operation transition chart shown in FIG. 2.

First, the power supply apparatus and partner apparatus are connected by a cable. Accordingly, the power supply apparatus (system controller 15) detects that a certain apparatus is connected (ST21). If bus reset is detected (YES in ST22), the flow advances to bus reset processing (ST23). If no bus reset is detected (NO in ST22), the power supply apparatus supplies electric power to the partner apparatus under the control of the system controller 15 or power controller 11 or 12 (ST24).

When a partner apparatus receives electric power from another apparatus, the physical layer of this partner apparatus becomes operable. However, the physical layer of a partner apparatus which stops power supply from its own power source does not become operable even if power is supplied from another apparatus. If the physical layer of the partner apparatus becomes operable, the partner apparatus sends a self-ID packet to the power supply apparatus. If the physical layer of the partner apparatus does not become operable, the partner apparatus does not send any self-ID packet to the power supply apparatus. That is, if the power supply apparatus does not receive any self-ID packet sent from the partner apparatus (NO in ST25), this partner apparatus stops power supply from its own power source (ST26). If the power supply apparatus receives a self-ID packet sent from the partner apparatus (YES in ST25) and confirms that the partner apparatus is a power consuming apparatus (YES in ST27), the power supply apparatus transmits a link-ON packet (ST28).

If no bus reset is detected (NO in ST29), power supply is stopped (ST30). If bus reset is detected (YES in ST29), authentication is executed between the power supply apparatus and partner apparatus (ST31). If it is determined by this authentication process that the partner apparatus is an object of power supply (YES in ST32), the power supply apparatus continues power supply to the partner apparatus (ST33). If it is determined that the partner apparatus is not an object of power supply (NO in ST32), the power supply apparatus stops power supply to the partner apparatus (ST30).

Figure 4:
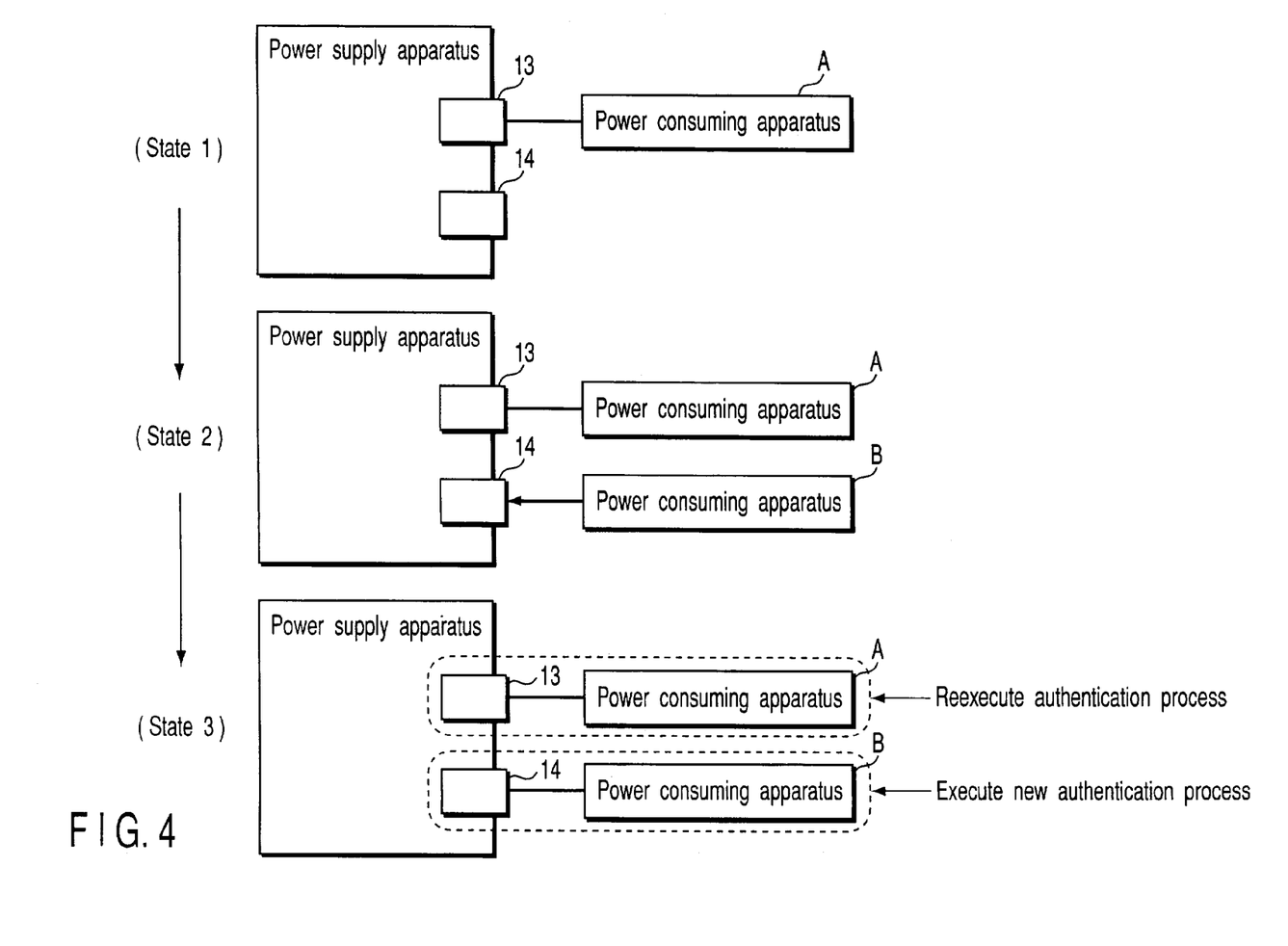
FIG. 4 is a chart showing an example of transition of the state of connection of the power consuming apparatus to the power supply apparatus.
Figure 5:
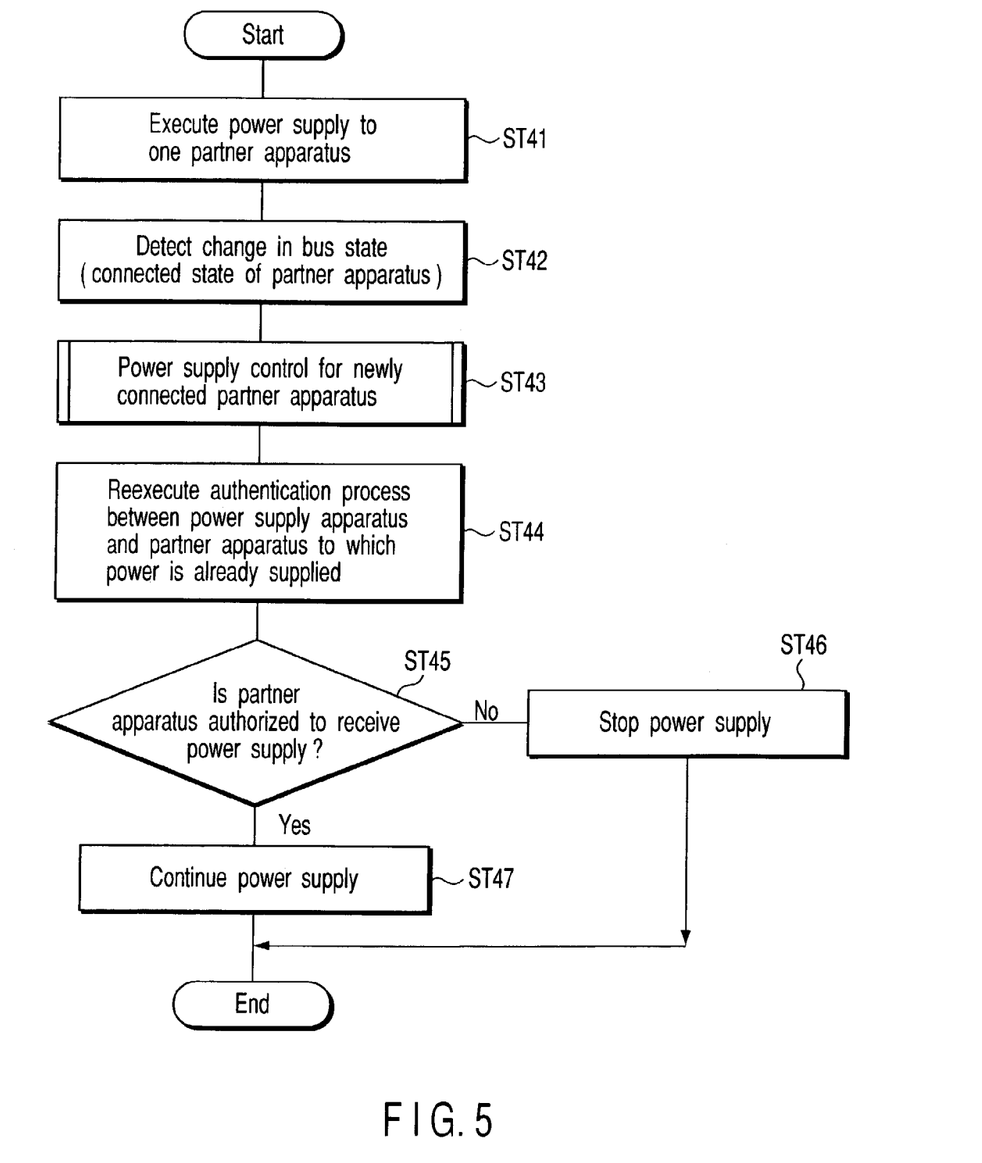
FIG. 5 is a flow chart showing an example of power supply control corresponding to the transition of the state of connection of the power consuming apparatus to the power supply apparatus.

An example in which a plurality of power consuming apparatuses are connected to one power supply apparatus will be described next with reference to FIGS. 4 and 5. FIG. 4 is a view showing transition of the state of connection of a power consuming apparatus to a power supply apparatus. FIG. 5 is a flow chart showing power supply control corresponding to the transition of the state of connection of the power consuming apparatus to the power supply apparatus.

As indicated by state 1 in FIG. 4, assume that a power consuming apparatus A is connected to the power supply apparatus, and electric power is supplied from the power supply apparatus to this power consuming apparatus A on the basis of the power supply control shown in FIGS. 2 and 3 (ST41).

When another power consuming apparatus B is newly connected as indicated by state 2 in FIG. 4, the system controller 15 of the power supply apparatus detects the change in bus state (connected apparatus) (ST42). As indicated by state 3 in FIG. 4, the power supply apparatus executes the power supply control shown in FIGS. 2 and 3 for this newly connected power consuming apparatus B (ST43). Subsequently, the power supply apparatus reexecutes the power supply control shown in FIGS. 2 and 3 for the power consuming apparatus A (ST44). That is, authentication is executed between the power supply apparatus and power consuming apparatus B, and authentication is reexecuted between the power supply apparatus and power consuming apparatus A. This increases the security. If it is determined by the authentication process that the power consuming apparatuses A and B are objects of power supply (YES in ST45), the power supply apparatus continues power supply to the power consuming apparatuses A and B (ST47). If it is determined that the power consuming apparatuses A and B are not objects of power supply (NO in ST45), the power supply apparatus stops power supply to the power consuming apparatuses A and B (ST46).

To reduce the processing, the authentication process between the power supply apparatus and power consuming apparatus A already connected to each other can be omitted.

It is also possible to control the timing of the authentication process and the start timing of power supply to the connected apparatus in accordance with the operating state of the power consuming apparatus. For example, assume that in state 1 of FIG. 4, video data is transmitted between the power supply apparatus and power consuming apparatus A. In this case, if the other power consuming apparatus B is newly connected as indicated by state 2 in FIG. 4, video data transmission is given priority over power supply control.

That is, even if the power consuming apparatus B is newly connected, connection-related processing must be immediately executed to continue video data transmission between the power supply apparatus and power consuming apparatus A. If the priority of the authentication process is high, the connection process may not be well executed in some cases. To prevent this, important processes such as video data transmission is preferentially performed, and the timing of the authentication process pertaining to power supply, the timing of power supply to the power consuming apparatus, and the timing of transmission of a link-ON packet are delayed. These series of authentication and power supply control processes are executed by using a change (bus reset) in the connection status on the IEEE1394 bus as a trigger.

More specifically, the system controller 15 detects the state of connection to a partner apparatus, and also detects the operating state of this partner apparatus. When this system controller 15 detects a change in the state of connection to the partner apparatus, if the system controller 15 determines from the operating state of the partner apparatus that a re-authentication process for the partner apparatus is unexecutable, the system controller 15 authenticates the partner apparatus after the re-authentication process becomes executable. Similarly, if the system controller 15 determines from the operating state of the partner apparatus that power supply to this partner apparatus is unstoppable, the system controller 15 stops power supply to the partner apparatus as needed after power supply becomes stoppable.

The information provided by the power consuming apparatus when authentication is performed between the power supply apparatus and power consuming apparatus will be explained below. This information provided by the power consuming apparatus contains authentication information, information concerning power consumption, and information concerning power branch to another apparatus. That is, the power supply apparatus can acquire these pieces of information at once during authentication. As a consequence, the communication traffic between the power supply apparatus and power consuming apparatus can be reduced.

The authentication processor 16 of the power supply apparatus can pinpoint the partner apparatus on the basis of the partner apparatus power consumption information contained in the information provided by the power consuming apparatus. By this pinpointing, the efficiency of the authentication process can be increased.

Also, on the basis of that information pertaining to power branch to another apparatus via the partner apparatus, which is contained in the information provide by the power consuming apparatus, the system controller 15 and first and second power controllers 11 and 12 control power supply from the power supply unit to the partner apparatus. For example, if there is power branch to another apparatus via the partner apparatus, power supply to this partner apparatus is stopped. This is so because, if another apparatus is connected via the partner apparatus, excess power supply from the power supply apparatus may occur, so it is necessary to prevent troubles caused by an event like this. In addition, if another apparatus is connected via the partner apparatus, electric power may be supplied to an unidentified partner (apparatus). Accordingly, if there is power branch to another apparatus via the partner apparatus, power supply to this partner apparatus is stopped.

Figure 6:
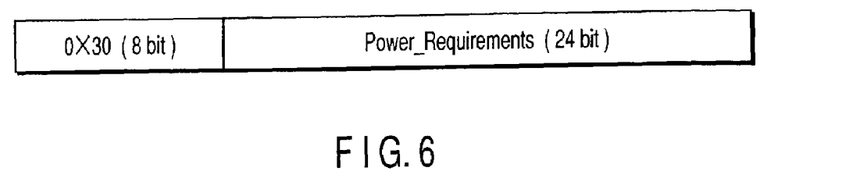
FIG. 6 is a view showing an example of description of the power capacity defined by the IEEE1394 standard.

Also, on the basis of the partner apparatus power consumption information contained in the information provided by the power consuming apparatus, the system controller 15 and first and second power controllers 11 and 12 control the capacity of power supply from the power supply unit to the partner apparatus. That is, electric power required by the partner apparatus is appropriately supplied. This prevents excess power supply and insufficient power supply. As shown in FIG. 6, a value indicating the power capacity defined by the IEEE1394 standard can also be used as this information concerning the power consumption. A register in 1394 config_ROM describing the power use amount is mapped in the 1394 config_ROM register. The value of 0x30 is used as a code for identifying unit_power_requirements. A 24-bit power_requirements field designates, by deciwatt (1/10 watt), the maximum value of a unit's power required value exceeding the power use amount generated when a link-ON packet is received.

Figure 7:
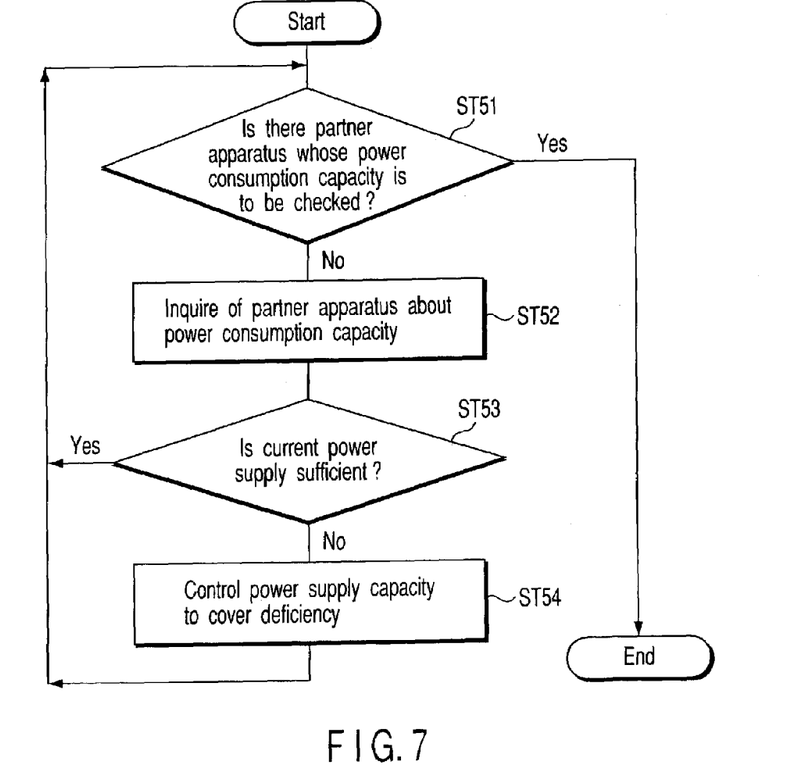
FIG. 7 is a flow chart for explaining an example of power capacity control.

Power capacity control will be described below with reference to FIG. 7. First, the presence/absence of a partner apparatus whose power capacity is to be checked is checked (ST51). If a partner apparatus whose power capacity is to be checked is present (YES in ST51), this partner apparatus is inquired of about the power consumption amount (ST52). If current power supply is deficient (NO in ST53), power supply is so controlled as to cover the deficiency (ST54).

The points of the present invention are summarized below.

When supplying power to a partner apparatus, a conventional power supply apparatus performs power supply without any checking process. As a result, if the partner apparatus is of bad behavior or has a malicious intent, a power supply circuit of the power supply apparatus may be damaged. The power supply apparatus of the present invention checks whether to supply power by confirming and authenticating a partner apparatus. On the basis of this check, the power supply apparatus controls whether to supply power. This makes it possible to reduce the load of a power supply circuit of the power supply apparatus, and protect the circuit from damage.

More specifically, to supply electric power, the power supply apparatus receives information concerning the power capacity required by a partner apparatus, and information concerning power branch from the partner apparatus, in addition to authentication information, when performing authentication between the power supply apparatus and partner apparatus. In this manner, the power supply apparatus can collect necessary information simultaneously with the authentication process.

The power supply apparatus can supply power to each partner apparatus connected to each connector.

Even when a bus state (connected state) changes, the power supply apparatus of the present invention can preferentially execute processing more important than authentication, or can delay an instruction of power supply control to the partner apparatus. This realizes power supply control without interfering with the important processing.

If the partner apparatus cannot be authenticated by the authentication process, the power supply apparatus of the present invention can disconnect the partner apparatus automatically or by a user's instruction.

The power supply apparatus of the present invention can supply electric power meeting the power capacity required by the partner apparatus.

As has been explained above, the present invention can provide an electronic apparatus and power supply method capable of stopping power supply to, e.g., an unidentified partner apparatus.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. An electronic apparatus comprising:
   a power supply unit for supplying electric power to a partner apparatus;
   a communication unit for communicating with the partner apparatus;

an authentication unit for authenticating the partner apparatus based on information acquired from the partner apparatus by the communication unit; and a power supply control unit for controlling power supplied to the partner apparatus by the power supply unit based on a result of authentication of the partner apparatus by the authentication unit, information contained in the acquired information and information regarding power branch to another apparatus via the partner apparatus, wherein the power supply control unit is configured to stop supplying power to the partner apparatus when the power supply control unit receives information that power is branched to another apparatus via the partner apparatus.

2. An apparatus according to claim 1, which further comprises:

a connection detecting unit configured to detect a state of connection to the partner apparatus; and an operation detecting unit configured to detect an operating state of the partner apparatus, wherein when the connection detecting unit initially detects a state of connection to a second partner apparatus while a state of connection to the partner apparatus is detected, the authentication unit authenticates the second partner apparatus based on information acquired from the second partner apparatus, wherein the power supply control unit controls power supplied to the second partner apparatus based on a result of authentication of the second partner apparatus, and when the operation detecting unit determines, from an operating state of the partner apparatus, that re-authentication of the partner apparatus is not executable, the authentication unit executes re-authentication of the partner apparatus based on information acquired from the partner apparatus after re-authentication becomes executable, and the power supply control unit controls power supplied to the partner apparatus based on results of re-authentication of the partner apparatus.

3. A power supply method comprising:

authenticating a partner apparatus of a power supply based on information acquired from the partner apparatus, and stopping power supplied to the partner apparatus when information is received that power is branched to another apparatus via the partner apparatus.

4. A method according to claim 3, wherein when a state of connection to a second partner apparatus is initially detected while a state of connection to the partner apparatus is detected, the second partner apparatus is authenticated based on information acquired from the second partner apparatus, and power supplied to the second partner apparatus is controlled based on a result of authentication of the second partner apparatus, and when re-authentication of the partner apparatus is determined to not be executable from an operating state of the partner apparatus, re-authentication of the partner apparatus is executed based on information acquired from the partner apparatus after re-authentication becomes executable, and power supplied to the first partner apparatus is controlled based on a result of re-authentication of the partner apparatus.

* * * * *